Sept. 20, 1960
C. F. ROBBINS
2,953,731
MOTOR CONTROL SYSTEM
Filed June 24, 1957
2 Sheets-Sheet 1
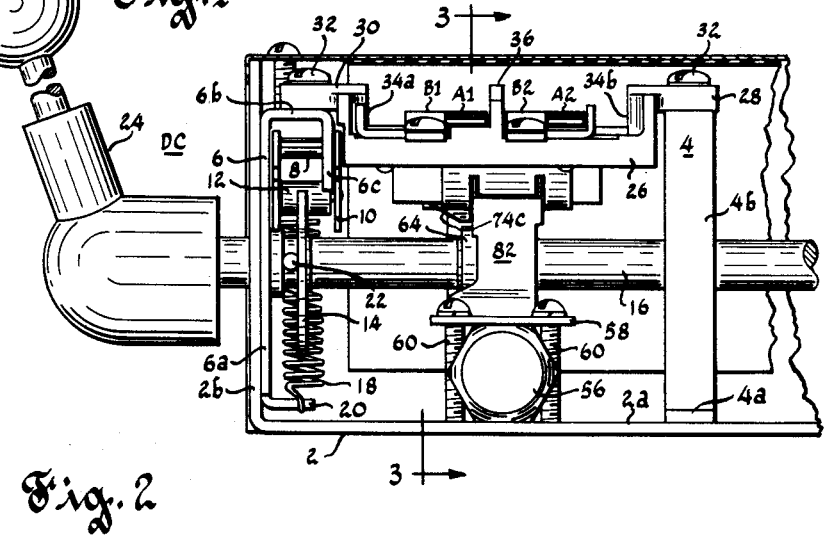
Inventor
Clyde F. Robbins
By H R Ratter
Attorney Inventor
Clyde F. Robbins
By H R Ratter
Attorney

United States Patent Office 2,953,731
Patented Sept. 20, 1960

2,953,731

MOTOR CONTROL SYSTEM

Clyde F. Robbins, Milwaukee, Wis., assignor to Cutler-Hammer, Inc., Milwaukee, Wis., a corporation of Delaware Filed June 24, 1957, Ser. No. 667,548

7 Claims. (Cl. 318—203)

This invention relates to improvements in motor control systems and more particularly to reversing and braking control systems.

While not limited thereto, the invention is especially applicable to control of plural phase alternating current induction motors having a built-in braking winding such as is disclosed in Samuel Noodleman Patent No. 2,627,059, dated January 27, 1953. In the Noodleman patent the braking winding is energized for a predetermined period of time following deenergization of the main stator winding in order to stop the motor. The present invention contemplates improved control means employing automatic timing means affording the dual function of controlling braking during stopping and reducing the reversing time of such motor.

Accordingly, an object of the invention is to provide improved means affording the aforementioned and other control functions.

A more specific object of the invention is to provide improved control means for automatically affording timed braking of an electric motor following disconnection from either forward or reverse operations.

Another specific object of the invention is to provide improved dynamic braking control means coacting with reversing control means to enhance reversal of an induction motor.

Another object of the invention is to provide an improved drum controller for affording the aforementioned functions which is simple in construction and readily adaptable for different operating conditions.

Other objects and advantages of the invention will hereinafter appear.

While the apparatus hereinafter described is effectively adapted to fulfill the objects stated, it is to be understood that I do not intend to confine my invention to the particular preferred embodiment of motor control system disclosed inasmuch as it is susceptible of various modifications without departing from the scope of the appended claims.

In the drawings,

Figure 1 is a front elevation view of a portion of the drum controller with a part of the cover removed, showing the timer mechanism;

Fig. 2 is a top view of the timer mechanism of Fig. 1;

Fig. 3 is a cross sectional view of the timer mechanism taken along lines 3—3 of Fig. 1;

Figure 5:
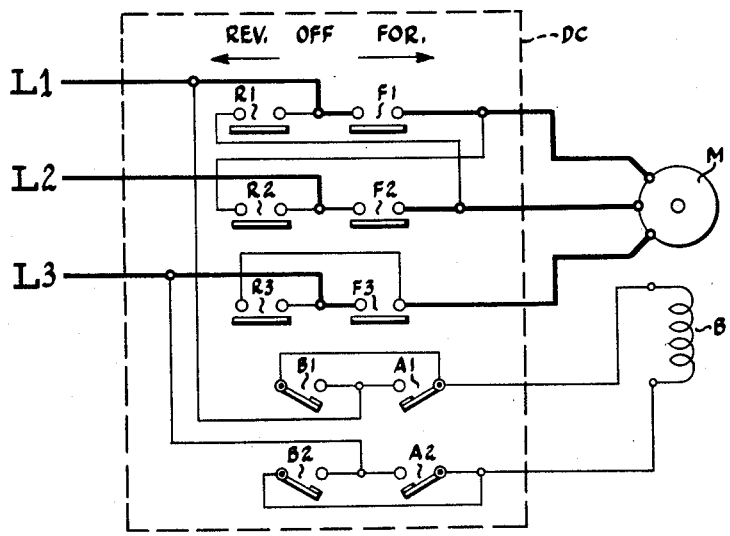
Fig. 5 diagrammatically depicts a motor control system incorporating the present invention.

Referring to Fig. 1, there is shown a manual drum controller indicated generally as DC, also diagrammatically shown in Fig. 5. Controller DC is provided with a generally U-shaped frame member 2 having a base portion 2a and two perpendicular end portions 2b, only the left-hand end portion 2b being shown in Fig. 1. A generally U-shaped intermediate supporting bracket 4, Fig. 2, is inverted over frame member 2 and rigidly secured at outwardly bent tips 4a of its leg portions 4b to the upper surface of base portion 2a transversely and intermediate the ends of the latter. A second supporting bracket 6 of substantially inverted L-shape has its shank portion 6a rigidly secured to the inner surface of perpendicular end portion 2b of frame member 2. The foot portion 6b of bracket 6 extends inwardly of drum DC and has at one side thereof a depending portion 6c for pivotally supporting through a pin 8 one end of a longitudinal detent 10. A roller 12 is mounted intermediate the ends of detent 10 for cooperation with a 3-position star wheel 14 rigidly secured to shaft 16 of the drum. A spring 18 connected between the other end of detent 10 and a projection 20 extending inwardly from the lower portion of bracket shank 6a biases the detent against the star wheel to maintain the drum in its selective forward, off or reverse positions. A radially extending projection 22 is rigidly secured to shaft 16 adjacent the star wheel for cooperation with a pair of angularly spaced stops (not shown) which may be integral with and extend inwardly from bracket 6 for limiting rotary movement of the shaft.

Shaft 16 extends through and is journaled in the perpendicular end portions of frame member 2 and is provided with an operating handle 24. The right-hand portion of the drum which is omitted from Fig. 1 has mounted thereon and operatively associated with shaft 16 the three-pole forward and reversing sets of bridging contacts F1–3 and R1–3 which are diagrammatically shown in the upper portion of Fig. 5. Brake contacts A1–2 and B1–2 shown in the lower portion of Fig. 5 are mounted between brackets 4 and 6 as hereinafter described.

As more clearly shown in Figs. 1 and 2, a brake contact supporting member 26 of insulating material is provided with a right-hand lateral extension 28 and a pair of left-hand lateral extensions 30 overlying the respective brackets 4 and 6 and secured thereto by screws 32 or the like. Member 26 depends between brackets 4 and 6 and is provided on its upper surface with a pair of contact cavities 34a and 34b separated by a transverse divider 36. A pair of stationary contacts 38 and 40, Fig. 2, extend across cavities 34a and 34b, respectively, in alignment with one another and parallel to the longitudinal axis of the drum. Movable contacts A1 and B1 extend inwardly from the opposite ends of cavity 34a with their free contact tip ends in overlying spaced relation to stationary contact 38. The other ends of movable contacts A1 and B1 are provided with electrical terminals 42 and 44, respectively, and secured therethrough to supporting member 26 by rivets or the like. Screws 46 are provided for making electrical connections to terminals 42 and 44. Similarly, movable contacts A2 and B2 extend inwardly from the opposite ends of cavity 34b with their free contact tip ends in overlying spaced relation to stationary contact 40. The other ends of movable contacts A2 and B2 are provided with electrical terminals 48 and 50, respectively, and secured therethrough to supporting member 26 by rivets or the like. Screws 52 are provided for making electrical connections to terminals 48 and 50. Movable contacts A1–2 and B1–2 are of the leaf spring type and are biased to close with their respective stationary contacts when released.

As more clearly shown in Figs. 3 and 4, a timing and operating mechanism is provided directly below contacts A1–2 and B1–2 for actuating the latter. This mechanism comprises a pair of times 54 and 56 of the dashpot type or the like arranged in axial alignment transversely of frame member 2, each timer being rigidly secured to the latter by a cross plate 58 and a pair of screws 60, as shown in Fig. 1. The respective timers are provided with actuators or pistons 54a and 56a having an axial bore therethrough and slidably accommodated on a common shaft 62 extending between the dashpots, pistons 54a and 56a being normally biased toward one another by springs 54b and 56b, respectively. Each timer is further provided with an adjustable screw 54c and 56c for setting the operating time thereof.

Figure 4:
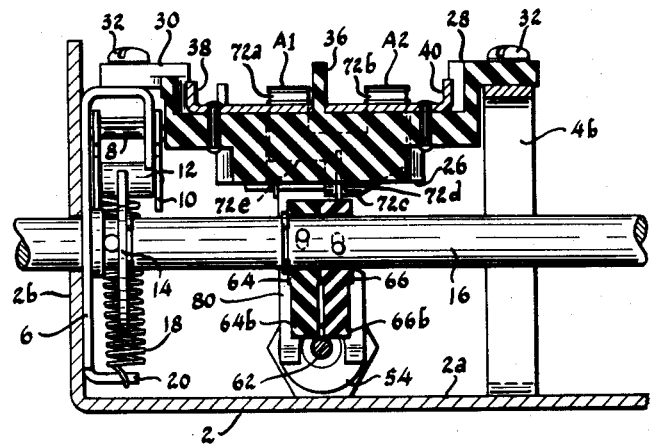
Fig. 4 is a partly schematic and partly sectional view of the timer mechanism of Fig. 1.

A pair of cams 64 and 66 are mounted on drum shaft 16 with a pin-and-slot lost motion connection as shown in Figs. 3 and 4. Each cam is provided with an eccentric portion 64a, 66a at its upper side and at its lower side a projection 64b, 66b normally extending between pistons 54a and 56a.

Contact supporting member 26 is provided with two pairs of openings therethrough, the openings of one pair being below movable contacts A1 and A2 and the openings of the other pair being below movable contacts B1 and B2, for accommodating identical plungers 72 and 74. Each plunger is a substantially U-shaped member having two parallel leg portions 72a, 72b as shown in Fig. 4 extending upwardly through and slidably accommodated in a respectively pair of openings for operating the movable contacts overlying the same. Each plunger is further provided with a cam follower portion 72c, 74c as shown in Figs. 3 and 4 for cooperation with cams 64 and 66. Cam follower portions 72c and 74c are provided with downwardly opening slots such as slot 72d shown in Fig. 4 for receiving timer levers hereinafter described. Plungers 72 and 74 are inserted upwardly into the respective pairs of openings in reverse relation to one another with their cam follower portions 72c and 74c overlying cams 64 and 66, respectively. A cutout portion, such as 72e on plunger 72, Fig. 4, is provided on each plunger to provide clearance for the cam associated with the other plunger.

The lower surface of contact supporting member 26 is provided with two spaced depending portions 76 and 78, Fig. 3, on opposite sides of the plungers for pivotally suspending timer levers 80 and 82, respectively. Lever 82 is generally inverted modified L-shaped and is pivoted adjacent the heel thereof on a pin 84 extending through depending portion 78. The downwardly extending shank portion of lever 82 extends between cam 64 and timer piston 56a and is provided at its lowermost end with a re-entrant portion 82a for cooperation on one side with projection 64b of cam 64 and on its other side with piston 56a, the extreme end of portion 82a being bifurcated to provide clearance for shaft 62. The foot portion 82b of lever 82 has a tapered end extending into the aforementioned slot in the cam follower portion of plunger 74. Lever 80 is similar in construction and reversely arranged relative to lever 82 for cooperation at its upper portion with plunger 72 and at its lower portion with cam 66 and timer piston 54a.

Referring to Fig. 5, there is shown a three phase alternating current induction motor M having in addition to its stator and rotor windings a built-in dynamic brake winding B. While brake winding B has hereinbefore been described as built into the motor stator, it will be apparent that the invention is equally applicable to control of electromagnetic friction brakes or other external circuits. The main stator winding of motor M is connectable for energization from a three phase alternating current power supply source through lines L1–3 and normally open forward contacts F1–3 or alternatively through lines L1–3 and normally open reverse contacts R1–3 of drum controller DC. Brake winding B is connectable for energization from lines L1 and L3 through normally open timer contacts A1–2 or alternatively through normally open timer contacts B1–2.

The operation of the system will now be described. Drum controller DC has a central off position as depicted in Fig. 5 wherein all the contacts are open, a forward operating position wherein contacts F1–3 are closed and a reverse operating position wherein contacts R1–3 are closed. When the operating handle 24 is moved from its off position clockwise as seen in Fig. 3 to its forward position, contacts F1–3 close to effect energization of the stator winding of motor M thereby to operate the latter. As shaft 16 is rotated in the clockwise direction, cam 66 is correspondingly rotated with the result that projection 66b, Fig. 4, of the cam pushes lever 80 and timer piston 54a in the left-hand direction until projection 66b travels beyond the convex surface of the bend in lever 80. As a result, actuator 54a slides on shaft 62 and spring 54b is compressed whereafter projection 66b maintains the timer in its set position. As lever 80 pivots on its pivot pin, its foot portion 80b moves down permitting plunger 72 to drop. However, eccentric portion 66a of cam 66 maintains plunger 72 in its upper position to bias contacts A1 and A2 open. During this time, the other cam 64 remains in its normal position due to its lost motion connection with shaft 16.

When it is desired to stop the motor, operating handle 24 is moved back to its off position. The resulting counterclockwise rotation of shaft 16 effects opening of contacts F1–3 to deenergize the main stator winding of the motor. Cam 66 remains stationary while shaft 16 is returned approximately half way to its normal position as the lost motion between cam 66 and shaft 16 is taken up. At this point the lost motion pin engages its associated slot within cam 66 and snaps the latter to its normal position. Rotation of cam 66 thus back to its normal position effects release of lever 80 and as the eccentric portion 66a of the cam is now clear of plunger 72 the latter is permitted to drop under the bias of movable contacts A1 and A2 to effect closure of the latter. Closure of contacts A1 and A2 results in energization of brake winding B to dynamically brake the motor.

The aforementioned release of lever 80 starts the timing action of timer 54. As a result, piston 54a of the timer slides in the right-hand direction along shaft 62 under the force of spring 54b and under the control of the dashpot. Piston 54a pivots lever 80 and foot portion 80b of the lever moves upwardly within the plunger slot 72d. Timer 54 is adjusted so that its timing interval terminates at approximately when foot portion 80b of lever 80 abuts the upper end of slot 72d, Fig. 4, in plunger 72 whereupon spring 54b snaps the timer piston to its normal position. As a result, lever 80 pivots further and kicks plunger 72 upwardly to effect quick opening of contacts A1 and A2. This terminates the braking action of winding B. Screw 54c adjacent the closed end of timer 54 may be adjusted to provide the desired braking interval and to open contacts A1 and A2 approximately when the motor reaches zero speed.

In the event the motor is operating in its forward direction and it is desired to reverse the same, the operating handle may be moved through its off position all the way to its reverse operating position. As a result, braking action will be attained through one timing operation in the same manner as hereinbefore described. In addition, rotation of shaft 16 to the reverse operating position will effect operation of cam 64 to set timer 56 while the lost motion connection of cam 66 permits the latter to remain in its central off position. The reversal of the motor power connections in conjunction with dynamic braking enhances deceleration of the motor. As the motor approaches zero speed, contacts A1 and A2 open as before to terminate the braking effect whereafter motor M accelerates in the reverse direction.

It will be seen that the provision of the two timers 54 and 56 affords dynamic braking to stop the motor from both forward and reverse directions of rotation. Also the drum controller may be moved from the forward operating position directly to the reverse operating position or vice versa. Under each of these conditions, dynamic braking is attained to reduce the motor stopping time in the former case and to reduce the motor reversal time in the latter case.

I claim:

1. In a control system for an electric motor, the combination with means for selectively energizing the motor for forward or reverse operations, of means operative concurrently with reversal of energization of the motor for effecting braking thereof for a predetermined time interval to enhance deceleration preparatory to reverse operation.

2. The combination according to claim 1, wherein the last mentioned means comprises preset timing means for establishing a dynamic braking circuit to the motor concurrently with reversal of energization thereof, and means responsive to said timing means for interrupting said circuit when the motor decelerates to zero speed.

3. In a control system for an electric motor, the combination with switch means comprising forward and reverse operating positions for selectively energizing the motor, of dynamic braking means for the motor, and means responsive to operation of said switch means from one of said operating positions to the other operating position for energizing said dynamic braking means for a predetermined time interval.

4. In a control system for an electric motor having selective switching means with forward and reverse operating positions for selectively energizing the motor, electrical braking means for the motor, timing means for controlling said braking means, means responsive to operation of said switch means to one of said operating positions for energizing the motor in accordance therewith and for setting said timing means, and means responsive to operation of said switch means to one or more other operating positions for energizing said braking means and for activating said timing means, said timing means acting at the end of a predetermined time interval to deenergize said braking means.

5. In a control device for an electric motor, a manual drum controller having forward and reverse operating positions and an off position, contacts on said controller for completing forward or reverse power connections to the motor in said respective operating positions, additional contacts on said controller for completing motor braking connections, timing means mounted on said ocntroller, means responsive to movement of said controller to one of said operating positions for setting said timing means and maintaining said additional contacts open, means thereafter responsive to movement of said controller to another operating position or to said off position for closing said additional contacts and activating said timing means to start a predetermined timed braking interval, and means responsive to termination of said timing interval for reopening said additional contacts.

6. The invention defined in claim 5, together with means responsive to said movement of said controller to said other operating position for effecting another setting of said timing means, and means thereafter responsive to movement of said controller to said off position for affording another timed braking interval.

7. The invention defined in claim 5, together with further contacts on said controller for completing motor braking connections in shunt of said additional contacts, means responsive to said movement of said controller to said other operating position for effecting another setting of said timing means and for maintaining said further contacts open, and means thereafter responsive to movement of said controller to said off position for closing said further contacts for another predetermined time interval.

References Cited in the file of this patent

UNITED STATES PATENTS

| | | |
|---|---|---|
| 2,627,059 | Noodleman | Jan. 27, 1953 |
| 2,651,747 | Warner | Sept. 8, 1953 |
| 2,779,906 | Adriansen | Jan. 29, 1957 |